United States Patent [19]
Willis

[11] 3,788,417
[45] Jan. 29, 1974

[54] EXHAUST DEVICE FOR AUTOMOTIVE VEHICLES

[75] Inventor: Floyd H. Willis, Los Angeles, Calif.

[73] Assignee: The Raymond Lee Organization, Inc., New York, N.Y.; a part interest

[22] Filed: Apr. 26, 1972

[21] Appl. No.: 247,863

[52] U.S. Cl. .................. 180/64 A, 60/324
[51] Int. Cl. ............................. B60k 13/04
[58] Field of Search ............ 180/64 A; 60/324

[56] References Cited
UNITED STATES PATENTS

| | | | |
|---|---|---|---|
| 2,515,391 | 7/1950 | Arbib | 180/64 A UX |
| 2,106,427 | 1/1938 | Hansson | 60/324 X |
| 2,260,578 | 10/1941 | Murray | 180/54 A |

Primary Examiner—Kenneth H. Betts
Assistant Examiner—Milton L. Smith
Attorney, Agent, or Firm—Daniel Jay Tick

[57] ABSTRACT

A funnel is affixed to and extends outward from the open free end of the tail pipe of the engine exhaust system of the engine of an automotive vehicle. A baffle is mounted in the throat of the funnel.

1 Claim, 4 Drawing Figures 3,788,417

EXHAUST DEVICE FOR AUTOMOTIVE VEHICLES

DESCRIPTION OF THE INVENTION

The present invention relates to an exhaust device for automotive vehicles. More particularly, the invention relates to an exhaust device for the engine exhaust system of an automotive vehicle.

The principal object of the invention is to provide an exhaust device for an automotive vehicle which improves and facilitates the scavenging of the exhaust gases of the vehicle when it is moving and increases the power and economy of operation of the vehicle when it is moving.

An object of the invention is to provide an exhaust device for an automotive vehicle which is of simple structure and functions efficiently, effectively and reliably to increase the power and economy of operation of a moving vehicle.

Another object of the invention is to provide an exhaust device for an automotive vehicle which considerably reduces automobile pollution by providing cleaner combustion and exhaust.

In order that the invention may be readily carried into effect, it will now be described with reference to the accompanying drawing, wherein.

In the FIGS., the same components are identified by the same reference numerals.

Figure 1:
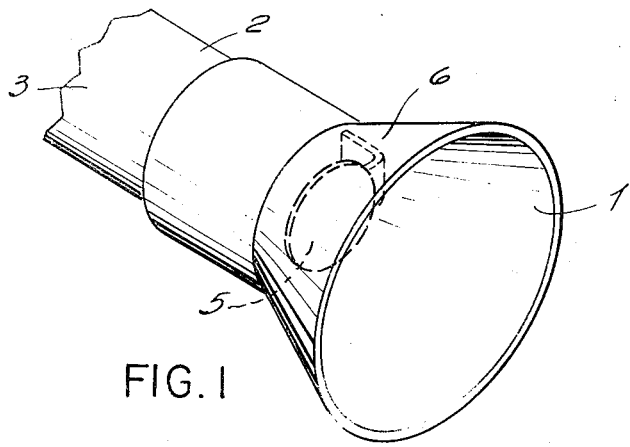
FIG. 1 is a perspective view of an embodiment of the exhaust device of the invention.

The exhaust device of the invention comprises a funnel 1 (FIGS. 1 to 4) affixed to and extending outward from the open free end 2 of the tail pipe 3 of the engine exhaust system of the engine of an automotive vehicle 4. The vehicle 4 is shown in FIG. 2, but neither its engine nor its engine exhaust system is shown in the FIGS.

A baffle 5 (FIGS. 1, 3 and 4) is mounted in the throat 6 of the funnel 1. The baffle 5 preferably comprises a disc coaxially mounted in the throat 6 of the funnel 1 and positioned at right angles to the axis 7 (FIG. 4) of said funnel. The baffle 5 is mounted in the throat 6 of the funnel 1 by any suitable means such as, for example, an L bracket.

The funnel 1 preferably comprises a sheet of metal formed in substantially frustoconical configuration. As shown in FIG. 2, the funnel 1 opens at substantially right angles to an air stream 8 passing the vehicle 4 when said vehicle is in motion.

Figure 2:
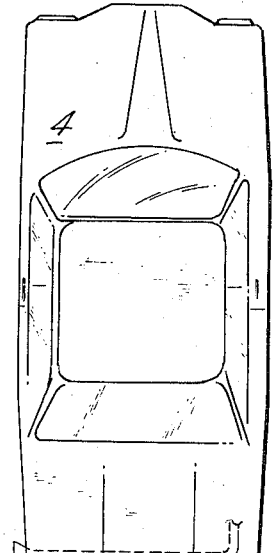
FIG. 2 is a top view of an automotive vehicle mounting the exhaust device of the invention.
Figure 3:
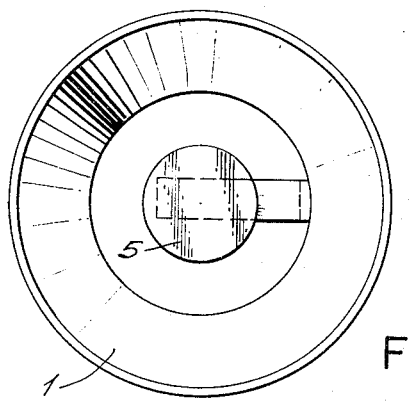
FIG. 3 is an end view of the embodiment of FIG. 1 of the exhaust device of the invention.
Figure 4:
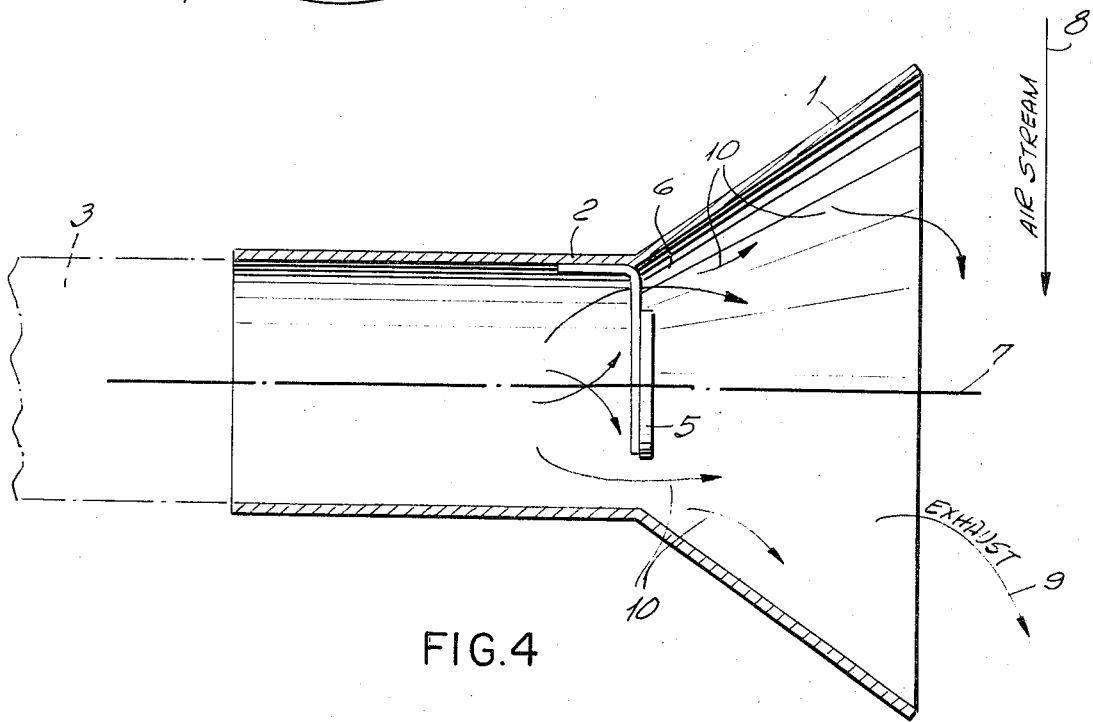
FIG. 4 is a side view, partly in section, of the embodiment of FIGS. 1 and 3 of the exhaust device of the invention.

The exhaust gases are shown in FIG. 2 by an arrow 9 and are shown in FIG. 4 by arrows 10.

The exhaust device of the invention extracts exhaust gases from the internal combustion engine of an automotive vehicle. The exhaust device of the invention improves and facilitates the scavenging of the exhaust gases of the engine of an automotive vehicle when the vehicle is moving. The baffle 5 diffuses or scatters the exhaust gases. When the funnel 1 is at the proper angle to the air stream 8 of a moving vehicle 4 (FIG. 2), a negative pressure and siphonation are produced. The negative pressure or vacuum and siphonation assist in the scavenging of the exhaust gases of the moving vehicle. Any number of such vacuum pumps may be mounted on the tail pipe 3 for greater scavenging.

The sides of the funnel 1 function to create the negative pressure by the design and configuration thereof and also serve as a shield for the exhaust gases 10 scattered by the baffle 5. The scattering of the exhaust gases causes a pressure drop, so that the air stream 8 blows off said exhaust gases more rapidly at lower speeds of movement of the vehicle 4.

The size of the baffle 5 must be sufficient to scatter the exhaust gases, but must not cause any restriction of the flow of said gases.

While the invention has been described by means of specific examples and in specific embodiments, I do not wish to be limited thereto, for obvious modifications will occur to those skilled in the art without departing from the spirit and scope of the invention.

I claim:

1. An exhaust device for an automotive vehicle having an engine and an engine exhaust system including a tail pipe having an open free end, said exhaust device comprising:

a funnel comprising a sheet of metal formed in substantially frustoconical configuration affixed to and extending outward from the open free end of the tail pipe, said funnel having a throat and opening at substantially right angles to an air stream passing the vehicle when said vehicle is in motion; and a baffle mounted in the throat of the funnel, the baffle comprising a disc coaxially mounted in the throat of the funnel and positioned at right angles to the axis of the funnel.

* * * * *